E. A. NELSON.
ENGINE AND MAGNETO ASSEMBLY.
APPLICATION FILED FEB. 14, 1912.
1,071,781.
Patented Sept. 2, 1913.
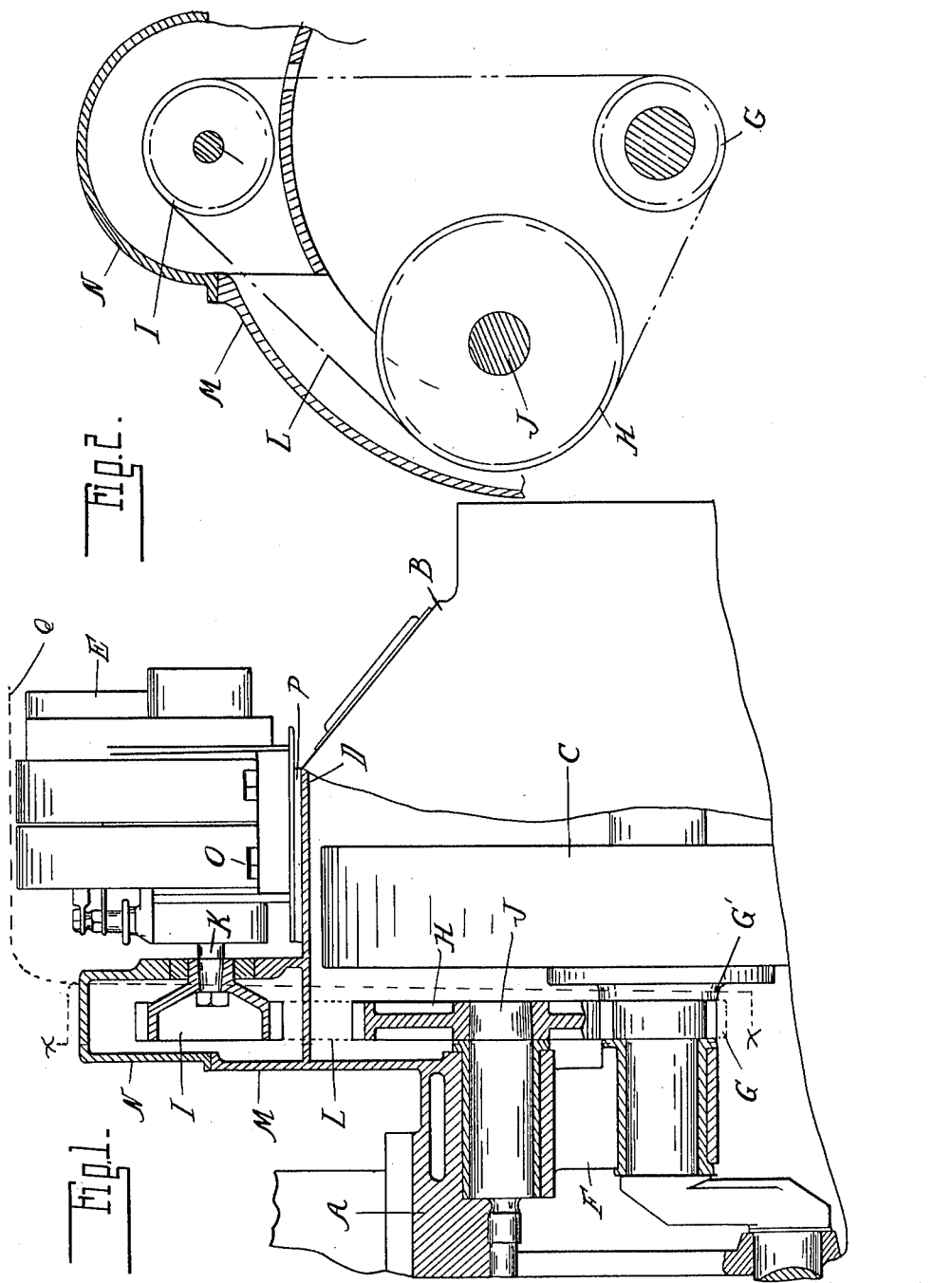
Witnesses
W. K. Ford
James O. Barry
Inventor
Emil A. Nelson
By Whittemore Hulbert & Whittemore
Att'ys

UNITED STATES PATENT OFFICE.

EMIL A. NELSON, OF DETROIT, MICHIGAN, ASSIGNOR TO HUPP MOTOR CAR COMPANY, OF DETROIT, MICHIGAN, A CORPORATION OF MICHIGAN.

ENGINE AND MAGNETO ASSEMBLY.

1,071,781.      Specification of Letters Patent.     Patented Sept. 2, 1913.

Application filed February 14, 1912. Serial No. 677,597.

*To all whom it may concern:*

Be it known that I, EMIL A. NELSON, a citizen of the United States of America, residing at Detroit, in the county of Wayne and State of Michigan, have invented certain new and useful Improvements in Engine and Magneto Assembly, of which the following is a specification, reference being had therein to the accompanying drawings.

The invention relates to explosion engines and consists in the novel construction and arrangement of the motor casing, the valve drive shaft and magneto, and a drive connection therefor as hereinafter set forth.

In the drawings, Figure 1 is a longitudinal section through a portion of the engine casing showing the magneto mounting thereon and the drive connection between the same and the crank shaft; Fig. 2 is a cross section on line x—x Fig. 1.

A is the engine crank casing which has formed integral therewith the extension B constituting a housing for the fly wheel C and the transmission gearing (not shown). The portion in which the fly wheel is housed is enlarged and upon the top of this enlargement is formed the mounting D for a magneto E. Intermediate the fly wheel and the end bearing F for the crank shaft is a sprocket wheel G on the crank shaft which is in the plane of sprockets H and I respectively upon the valve cam shaft J and the magneto shaft K. As shown in Fig. 2 the shaft J is arranged at one side of the vertical plane of the crank shaft and a single sprocket chain L passes around all three sprockets G, H and I. This chain is housed in an upward extension M above the portion B of the case and which is provided with a detachable cap N for covering the sprocket.

To provide means for tightening the chain L the magneto E is secured to the portion D of the case by clamping bolts O with shims P preferably sleeved on said bolts and intermediate the base of the magneto and the bearing D. Thus by exchanging the shims the shaft K of the magneto may be raised or lowered as is necessary to properly adjust the chain.

The construction and arrangement described is one which is convenient for motor vehicles as the magneto is positioned adjacent to the dash of the vehicle and may be located in a recess or pocket in said dash as indicated by the dotted line Q. To economize space the sprocket wheel G is preferably formed integral with the crank shaft and is provided with a flange G' for attaching the fly wheel. Thus the space that is usually occupied by the hub of the fly wheel is sufficient for both the sprocket and the fly wheel attachment.

What I claim as my invention is:

1. The combination with the engine casing provided with an enlargement for the fly wheel, of a magneto mounted on said enlargement, a crank shaft having a fly wheel thereon, a bearing for said crank shaft, and a drive gearing for said magneto between said crank shaft bearing and said fly wheel.

2. The combination with an engine casing having an enlargement for the fly wheel, of a crank shaft and fly wheel within said casing, a magneto mounted upon said enlargement, a drive gearing for said magneto from said crank shaft adjacent to said fly wheel, and an extension above said fly wheel housing for housing said magneto drive connection.

3. The combination with an engine casing having an enlargement for the fly wheel, of a crank shaft within said casing, a fly wheel mounted thereon, a valve cam shaft parallel with said crank shaft and at one side of the vertical plane thereof, a magneto mounted on said fly wheel housing above said crank shaft, and a single drive connection from said crank shaft for said valve cam shaft and magneto.

4. The combination with an engine casing having an enlargement for the fly wheel, of a crank shaft journaled within said casing and having the fly wheel mounted thereon, a valve cam shaft parallel with said crank shaft within said housing and at one side of the vertical plane of the crank shaft, a magneto mounted on top of said fly wheel housing and having its shaft parallel with the crank shaft, a drive chain connecting said crank shaft with said valve shaft and magneto shaft, and an upward extension of the fly wheel housing forming a housing for the magneto drive.

5. The combination with an engine crank case, of a fly wheel housing, a fly wheel within said housing, an engine crank shaft having an integral enlargement forming a sprocket wheel and a fly wheel attachment, a magneto mounted upon said fly wheel housing, and a chain connecting said magneto with said sprocket wheel and arranged adjacent to said fly wheel.

6. The combination with an engine casing provided with an enlargement for the fly-wheel, of a magneto mounted on said enlargement, a crank shaft having a fly-wheel thereon, a bearing for said crank shaft, and a drive gearing for said magneto between said crank shaft bearing and said fly-wheel, said magneto being adjustable to properly position the drive gearing.

7. The combination with an engine casing provided with an enlargement for the fly-wheel, of a magneto mounted on said enlargement, a crank shaft having a fly-wheel thereon, a gear on said crank shaft, a sprocket on said magneto, and a drive chain connecting said sprocket and gear, said magneto being adjustable to regulate said drive chain.

In testimony whereof I affix my signature in presence of two witnesses.

EMIL A. NELSON.

Witnesses:
FRANK E. WATTS,
GRANVILLE C. ALDRICH.

Copies of this patent may be obtained for five cents each, by addressing the "Commissioner of Patents, Washington, D. C."